United States Patent [19]

Zhang

[11] Patent Number: 5,132,965
[45] Date of Patent: Jul. 21, 1992

[54] NONBLOCKING PARALLEL BANYAN NETWORK

[75] Inventor: Ning Zhang, Danville, Calif.

[73] Assignee: Pacific Bell, San Francisco, Calif.

[21] Appl. No.: 518,208

[22] Filed: May 3, 1990

[51] Int. Cl.⁵ ............................................. H04J 3/26
[52] U.S. Cl. ................................................... 370/60
[58] Field of Search ................ 370/60, 85.5, 85.15, 370/94.1, 94.2, 99

[56] References Cited

U.S. PATENT DOCUMENTS

| | | | |
|---|---|---|---|
| 4,491,945 | 1/1985 | Turner | 370/60 |
| 4,602,365 | 7/1986 | White et al. | 370/85.5 |
| 4,651,318 | 3/1987 | Luderer | 370/60 |
| 4,661,947 | 4/1987 | Lea et al. | 370/60 |
| 4,670,871 | 6/1987 | Vaidya | 370/60 |
| 4,761,780 | 8/1988 | Bingham et al. | 370/60 |
| 4,785,446 | 11/1988 | Dias et al. | 370/58 |
| 4,788,679 | 11/1980 | Kataoka | 370/60 |
| 4,797,880 | 1/1989 | Bussey, Jr. et al. | 370/60 |
| 4,813,038 | 3/1989 | Lee | 370/60 |
| 4,817,084 | 3/1989 | Arthurs et al. | 370/60 |
| 4,866,701 | 9/1989 | Giacopelli et al. | 370/60 |
| 4,905,224 | 2/1990 | Lubojinsky | 370/60 |
| 4,912,701 | 3/1990 | Nicholas | 370/94.1 |

Primary Examiner—Douglas W. Olms
Assistant Examiner—Min Jung
Attorney, Agent, or Firm—McCubbrey, Bartels, Meyer & Ward

[57] ABSTRACT

A packet routing network for outputting information packets from a plurality of network input ports to a plurality of network output ports, each packet having a destination address specifying one of the output ports to which the packet is to be sent. The packet routing network includes an arbiter for transmitting only packets having distinct destination addresses, a plurality of parallel Banyan routers, and distribution and selection means for distributing packets having distinct destination addresses to the Banyan routers and selecting one of the Banyan routers and one of a limited set of active router input lines of the selected Banyan router such that the distributed packets will not collide with any other packets while being routed through the Banyan router. The present invention utilizes a preprocessing instead of sorting to achieve nonblocking in Banyan routers. This eliminates the problem of the limit on the bit rate due to the requirement of stage-by-stage synchronization in the prior art Batcher-Banyan networks.

8 Claims, 7 Drawing Sheets

NONBLOCKING PARALLEL BANYAN NETWORK

FIELD OF THE INVENTION

The present invention relates generally to telecommunication systems and more particularly to nonblocking packet routing networks.

BACKGROUND OF THE INVENTION

Optical fiber transmission systems have made possible high speed digital networks having data rates in excess of 1000 million bits per second (1000 Mbps). Many different kinds of communication systems based on fiber optic transmission have been implemented or proposed. One of these proposed systems operates by sending messages called "packets" between users. Each packet includes a destination address which is used to route the packet through the various switches in a telephone system. This type of system is referred to as a packet switching network.

A modern optical fiber can easily transport signals at the rate of several gigabits per second, while the bit rates of present switches (even experimental switches) are lower by two orders of magnitude. In order to fully utilize the high data rates of modern optical fiber communications systems, it is necessary to significantly increase the switching speeds.

The switches operate between input and output ports connected to the optical fibers. There may be hundreds of optical fibers connected to a single switch. To properly route a packet arriving on one of the input ports, the switch must read the address portion of the packet and then transfer the packet to the desired output port. The switching must be accomplished for each packet arriving on each optical fiber. As the packets are routed through the switch, they must not collide, an event causing one packet to block another. If packets are blocked, the information contained in them can be lost.

Prior art packet switch designs can be classified into two approaches: (1) complete cross-connection and (2) self-routing interconnection. In a complete crossconnection system, a central processing unit sets up the switching pattern. It has the disadvantage of requiring an extremely high computational load for large communications systems. In a self-routing system, each switch sets itself.

Self-routing interconnection has been implemented by so-called Batcher-Banyan networks. The Batcher-Banyan network is composed of N×N Batcher sorters and N×N Banyan routers (where N is the number of input ports or output ports). The routers have a plurality of stages, each stage including a routing circuit with a plurality of input and output lines. In the Batcher-Banyan network, packets progress through a number of stages of sorter cells before going through router cells. The purpose of sorting is to ensure that packets will not collide in the later router cells.

The complexity of the Banyan-Batcher network is greatly increased by the Batcher sorters which require approximately $k^2/2$ stages of sorter cells (where k is the number of stages in the Banyan-Batcher network). There are N/2 sorter cells at each stage, and the clock signal has to propagate itself throughout all these N/2 cells to assure synchronicity as described below.

The Batcher-Banyan network sorts packets according to their destinations in a manner that avoids packet collisions. The Batcher sorter, however, places an intrinsic limit on the bit rate. A sorter cell is a 2×2 switch which chooses between parallel and cross-routing patterns, based on a lexicographic comparison between the two input bit streams. This requires the synchronized arrival of signals of the two bit streams at the sorter cell. Outputs of all sorter cells at one stage are connected to inputs of sorter cells at the next stage through a shuffle exchange. In particular, the two inputs to a cell at any stage come from outputs of two different cells at the previous stage. Thus, the requirement of signal synchronization is not just between the two bit streams at each cell, but rather among all bit streams. In other words, the packets on the input lines must all arrive at the same time. This places a severe limit on the bit rate of the sorting fabric.

To ensure the simultaneous arrival of all the packets on the input lines requires a stage-by-stage bit signal realignment among all simultaneously routed packets inside the sorter. The bit rate is severely limited by this clocking requirement. This further results in the serious disadvantage that the larger the switch size, the lower the bit rate. The experimental implementation of the Batcher-Banyan network, for example, achieves the rate of only 55 Mbps for a 32×32 switch.

In addition to the requirements for significantly greater switching speeds, any new switching devices must also possess:

(1) capability for communication speeds that vary from tens of bits per second to more than a few hundred Mbps,
(2) capability for communications with different properties, (3) flexibility to handle different bandwidths and connection types, (4) capability to distribute signals economically, and (5) capability to meet future demands.

SUMMARY OF THE INVENTION

Broadly, it is an object of the present invention to provide an improved packet routing network switch.

It is a further object of the present invention to provide a switch having a nonblocking characteristic while operating at speeds commensurate with data rates of optical fiber networks.

These and other objects of the present invention will become apparent to those skilled in the art from the following detailed description of the invention and the accompanying drawings.

The present invention comprises a packet routing network for outputting information packets input on a plurality of network input ports thereto to a plurality of network output ports therefrom, each packet having a destination address specifying one of the output ports to which the packet is to be sent. The packet routing network includes an output contention arbiter for transmitting only packets having distinct destination addresses, a plurality of parallel Banyan routers, and distribution and selection means for distributing packets having distinct destination addresses to the Banyan routers and selecting one of the Banyan routers such that the distributed packets will not collide with any other packets while being routed through the Banyan router.

The present invention preprocesses the packets instead of sorting them to achieve nonblocking in Banyan routers. This eliminates the problem of the limit on the bit rate due to the requirement of stage-by-stage synchronization in the prior art Batcher-Banyan networks.

The present invention provides a high speed alternative to the Batcher-Banyan network. It allows a higher data rate because it avoids the problem of stage-by-stage signal realignment in the Batcher sorter. Switching speeds to less than 1 nanosecond are possible.

Because the present invention guarantees nonblocking by a preprocessing technique, it can handle extremely wide variations of data bit rates, different kinds of communications such as voice and data, and different bandwidths and connection types. Further, because the present invention does not require significant new hardware, has minimal complexity, and operates very efficiently, it is economical to implement and to operate.

DETAILED DESCRIPTION OF THE INVENTION

The detailed description of the present invention begins with a description of Banyan routers which are an integral part of the present invention. Thereafter, the nonblocking system according to the present invention will be described including a proof of the nonblocking characteristic. Simple examples will be provided where helpful for understanding.

A Banyan router routes packets from a plurality of input lines to a plurality of output lines such that any input line can be connected to any output line. Thus, for example, in a telephone system any caller connected to an input line can reach any destination connected to an output line.

Figure 1:
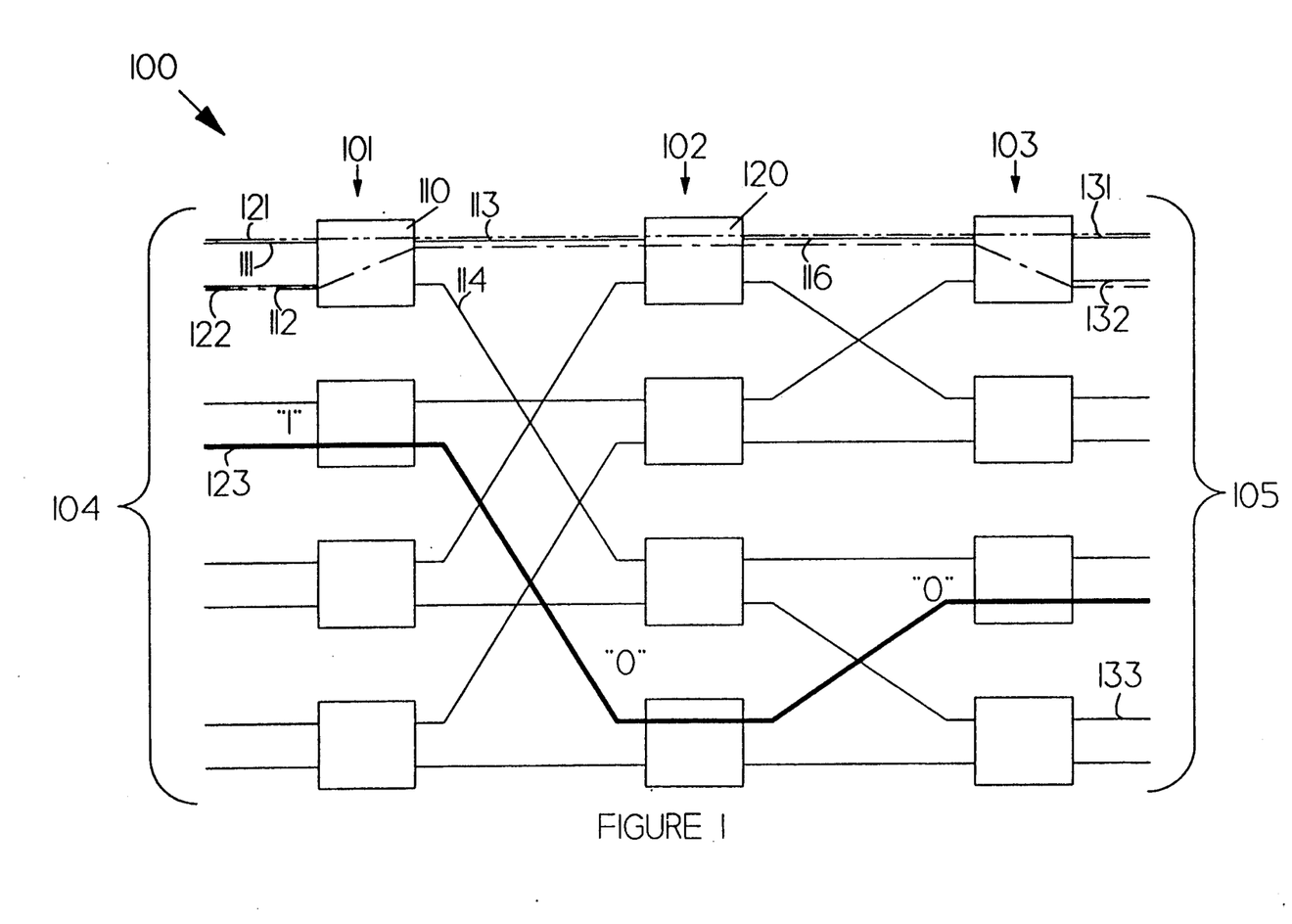
FIG. 1 is a schematic representation of an exemplary Banyan router having eight input lines and eight output lines as utilized in the present invention.

An exemplary Banyan router having eight input lines and eight output lines (an 8×8 router) is shown in FIG. 1 at 100. Banyan router 100 routes packets present on input lines 104 to output lines 105 based on a threebit destination address included in each packet. Banyan router 100 comprises three stages 101-103. Each stage consists of four routing elements of which routing element 110 is typical.

Each routing element 110 has two input lines 111 and 112 and two output lines 113 and 114. The manner in which the input lines and output lines are connected to each other in each routing element depends on one of the bits constituting the packet destination address. Each stage in Banyan router 100 operates on a different bit of the address (and therefore the number of destination address bits must equal the number of stages). Stage 101 is controlled by the most significant bit, stage 102 by the second bit, and stage.103 by the least significant bit of the destination address. If the bit is 0, the packet will be routed to the upper output line of the routing element (for instance output line 113 of routing element 110). If the bit is 1, the packet will be routed to the lower output line of the routing element (for instance, output line 114 of routing element 110). Thus, for example, a packet with a binary destination address of [100] on line 123 will be routed from input line 123 to output line 133 following the heavy line shown in FIG. 1.

The term "blocking" means that two or more incoming packets are directed to the same output line, thereby resulting in a collision in that output line. There are two kinds of blocking. "Output blocking" refers to two or more incoming packets having the same destination address. "Internal blocking" refers to two or more incoming packets requiring the same output line at any of the stages.

Output blocking can be avoided by an "arbiter for output contention" to be described below.

As a simple example of internal blocking, refer again to FIG. 1. Suppose a packet on input line 121 has a desired destination at output line 131, and a packet on input line 122 has a desired destination at output line 132. As shown by the dashed line for the input line 12 packet and the dotted line for the input line 122 packet, there will be an internal block at the upper routing element output line 113 of routing element 110 of stage 101. Similarly, there will be another internal block at the upper routing element output line 116 of routing element 120 of stage 102.

In general, a routing element routes according to the $j^{th}$ bit of the destination address. There will be an internal block of the destination addresses of the packets on the upper or lower input ports of the routing element if the packet's destination address has the same value for the $j^{th}$ bit The example just given described an 8×8 Banyan router. In general, if k is the number of stages in the Banyan router, then an N×N (where $N=2^k=$number of input lines) Banyan router has $2^{k-1}$ routing elements in which the $i^{th}$ stage routes packets according to the $i^{th}$ bit of the packet destination address.

Banyan routers (also referred to as Banyan networks) have input/output labels at the input lines and output lines of each routing element of each stage. The output label of a routing element is transformed by a so-called shuffle exchange to become the input label of the succeeding routing element. This will be described in detail below.

The input line label is binary coded. For example, for a $k=3$ router, the labels and addresses must each have three bits. Incoming lines 0, 1, 2, 3, 4, 5, 6, and 7 have binary line labels of 000, 001, 010, 011, 100, 101, 110, and 111 respectively. Each routing element in each stage of the router has input line labels and output line labels, each also constituting k bits. As mentioned above, the packet destination address also constitutes k bits.

The function of a Banyan router can be represented by operations on the sequence of bits representing the router input lines and the packet destination address producing a path through the router which successfully reaches the desired destination address. The operation comprises specific exchange transformations performed on the input-line-label/destination-address bit sequence (hereafter referred to as the bit sequence) which will ultimately direct the packet to the desired destination address.

A theoretical description for a general k stage router will be given herein, followed by an example of a k=3 router.

Let the input lines label be given by $i_1 i_2 ... i_k$ and the packet destination address be given by $o_1 o_2 ... o_k$. The transformation $T_{p,q}$ exchanges the $p^{th}$ and $q^{th}$ bits in the sequence $\{s_j\}_{j=1,k}$ as follows:

$$s_1 s_2 ... s_k T_{p,q} = s_1 ... s_{p-1}, s_q, s_{p+1}, ..., s_{q-1}, s_p, s_{q+1}, ..., s_k) \quad (1)$$

The functionality of an N×N Banyan router can be described by the transformations acting on a bit sequence producing a new bit sequence as shown following:

$$\begin{array}{l} i_1 ... i_k o_1 ... o_k\, T_{k,k+1}\, i_1 ... i_{k-1} o_1 i_k o_2 ... o_k \\ T_{1,k}\, o_1 i_2 ... i_{k-1} i_1 i_k\, o_2 ... o_k \\ T_{k,k+2}\, o_1 i_2 ... i_{k-1} o_2 i_k i_1 o_3 ... o_k \\ \vdots \\ T_{j-1,k}\, o_1 ... o_{j-1} i_j ... i_{k-1} i_{j-1} i_k i_1 ... i_{j-2} o_j ... o_k \\ T_{k,k+j}\, o_1 ... o_{j-1} i_j ... i_{k-1} o_j i_k i_1 ... i_{j-1} o_{j+1} ... o_k \\ \vdots \\ T_{k-1,k}\, o_1 ... o_{k-1} i_k i_1 ... i_{k-2} o_k \\ T_{k,2k}\, o_1 ... o_k i_k i_1 ... i_{k-1} \end{array} \quad (2)$$

The input line labels and output line labels for the routing elements at each stage are displayed in the following TABLE I.

TABLE I

|  | Label of input line | Label of output line |
|---|---|---|
| Stage 1: | $i_1 ... i_k$ | $i_1 ... i_{k-1} o_1$ |
| Stage 2: | $o_1 i_2 ... i_{k-1} i_1$ | $o_1 i_2 ... i_{k-1} o_2$ |
| ⋮ | | |
| Stage j: | $o_1 ... o_{j-1} i_j ... i_{k-1} i_{j-1}$ | $o_1 ... o_{j-1} i_j ... i_{k-1} o_j$ |
| ⋮ | | |
| Stage k: | $o_1 ... o_{k-1} i_{k-1}$ | $o_1 ... o_k$ |

To correlate with Equations (2), the input line labels begin with the incoming line binary representation $i_1...i_k$, and subsequently the k bits adjacent every other $T_{p,1}$ transformation operation starting with $T_{1,k}$. The output line labels are the k bits adjacent every other $T_{p,q}$ transformation operation starting with $T_{k,k+1}$.

The final result is that at the end of the three stages, the destination address is the same as that at the beginning assuring that the packet will reach the desired destination.

Following the general transformation sequence above, an example for k=3 has the transformation sequence shown following. Note that the transformation $T_{p,q}$ operates on the bit sequence to transform an output line label of a routing element to an input line label of the subsequent routing element.

$$\begin{array}{l} i_1 i_2 i_3 o_1 o_2 o_3\, T_{3,4}\, i_1 i_2 o_1 i_3 o_2 o_3 T_{1,3}\, o_1 i_2 i_1 i_3 o_2 o_3 \\ T_{3,5}\, o_1 i_2 o_2 i_3 i_1 o_3 T_{2,3}\, o_1 o_2 i_2 i_3 i_1 o_3 T_{3,6}\, o_1 o_2 o_3 i_3 i_1 i_2 \end{array} \quad (3)$$

Figure 2:
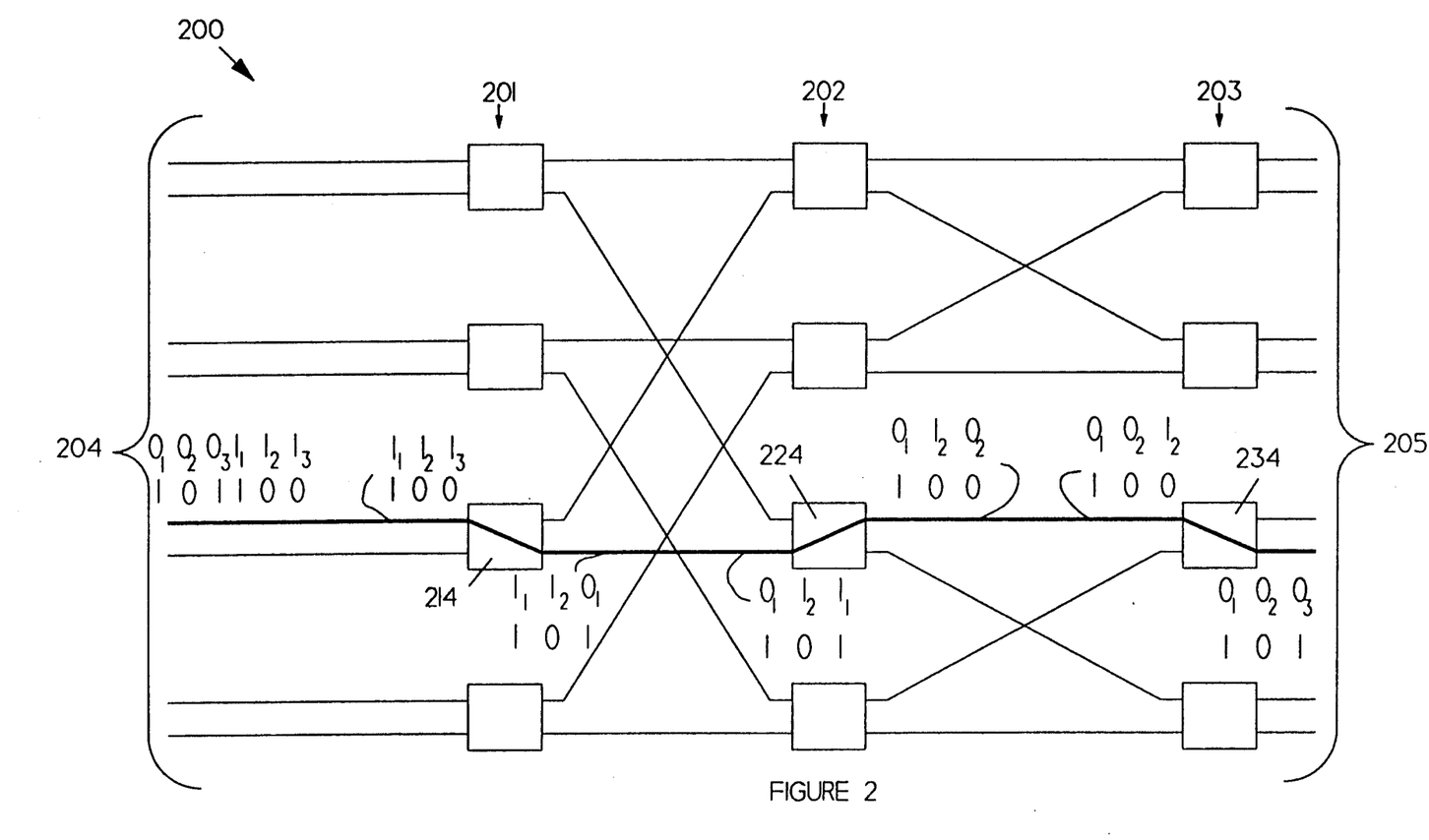
FIG. 2 is a schematic representation of an exemplary 8×8 Banyan router illustrating an example of routing a packet having an input-port/destination-address bit sequence according to the present invention.

FIG. 2 illustrates the k=3 case for an 8×8 Banyan router 200. Incoming lines 204 have input line numbers from 0 to 7 represented by binary input line labels [000] to [111] with input line 4 (binary address [100]) carrying a packet having a destination address [101] which corresponds to output line number 5 as shown at output lines 205. The initial input line label is thus [100] and the destination address is [101]. The bit sequence is for this example [100101]. At the entrance to the first stage 201, the bit sequence is not transformed and the input line label remains as [100] as shown. As described above, routing element 214 acts on the most significant bit of the destination address (here [1]) and directs the packet to the [1] output line of routing element 214. The transformation $T_{3,4}$ exchanges the third and fourth bits of the bit sequence to produce the first stage output line label $i_1 i_2 o_1$ which, upon transformation by the next operator $T_{1,3}$, becomes $o_1 i_2 i_1$, forming the second stage input label. The transformations are performed automatically by the specific connections in a shuffle exchange For example, the $T_{3,4}$ transformation occurs in routing element 214 and is termed a "local shuffle" while the $T_{1,3}$ transformation occurs in the connection between stages 201 to 202 and is termed a "perfect shuffle." These types of automatic shuffle exchanges are known in the telecommunications arts. Routing element 224 of second stage 202 routs the packet to the upper [0] output and $T_{3,5}$ transforms the bit sequence to produce output line label $o_1 i_2 o_2$ which is then transformed by $T_{2,3}$ to produce third stage input line label $o_1 o_2 i_2$. Finally, third stage 203 routing element 234 directs the packet to the lower [1] output and the bit sequence is transformed to produce $o_1 o_2 o_3$.

If there are N incoming packets, each having a distinct destination address, to be directed through an N×N Banyan router, then the packets will be nonblocking if and only if every pair of output lines of the same routing element has a distinct output line label in each stage. This is evident because of the definition of blocking given above wherein the term "blocking" was defined as two or more incoming packets being directed to the same output line, thereby resulting in a collision in that output line. Output blocking will not occur because two or more incoming packets will not have the same destination address. Internal blocking will not occur because two or more incoming packets will not require the same output line at any of the stages.

The present invention ensures nonblocking by utilizing a parallel Banyan network and directing incoming packets having distinct destination addresses to specific Banyan routers. By the choice of Banyan router according to the present invention, the packets will not experience internal blocking because of the inherent functionality of Banyan routers. The proof of the above proposition follows.

For $N=2^k$, let $m = \text{integer}(k/2)$ (the integer part of $k/2$), then a parallel Banyan network comprising $2^m$ Banyan routers can be shown to be nonblocking as follows.

Assume first that the incoming packets have distinct destination addresses. Then if the incoming packet with the destination address $o_1...o_k$ is sent to the Banyan router with the label $o_{-m+1}...o_k$, in each Banyan router only the $2^{k-m}$ input lines with the labels $0...0 i_m...i_{k-1} 0$ can receive an incoming packet.

From TABLE I above, for the first to $m^{th}$ stages, the output line labels are given by:

TABLE II $i_1 ... i_{k-1} o_1$
$o_1 i_2 ... i_{k-1} o_2$

TABLE II-continued $$o_1 \ldots o_{m-1} i_m \ldots i_{k-1} o_m$$

The output line labels are unique in each 1 to $m^{th}$ stage because they contain the difference pattern $i_m \ldots i_{k-1}$, as can be seen from TABLE II.

The output line labels for the $(m+1)^{th}$ to the $k^{th}$ stages are given by (again from TABLE I):

TABLE III $$o_1 \ldots o_m i_{m+1} \ldots i_{k-1} o_{m+1}$$
$$o_1 \ldots o_{m+1} i_{m+2} \ldots i_{k-1} o_{m+2}$$
$$\vdots$$
$$o_1 \ldots o_k$$

The output line labels are unique for the $(m+1)^{th}$ to stages $k^{th}$ because they contain the difference pattern $o_1 \ldots o_{k-m}$.

If k is even, k−m=m, if k is odd, k−m=m+1.

Therefore, given that the output line labels are distinct in each stage, then for N incoming packets having distinct destination addresses, the N x N Banyan router is nonblocking.

Broadly, the present invention operates as follows: In each round of switching, the switch attempts to route the head-of-line packet at every input buffer to its destination output. The present invention's Distributed Nonblocking Parallel Banyan Network (DNPBN) routes packets from input ports to output ports. Packets having distinct destinations are switched through the self-routing interconnection network to their respective destination outputs without blocking. If there are multiple packets having the same destination address, only one packet is selected for routing and the others are stored in a buffer for re-attempt in the next round.

Figure 3:
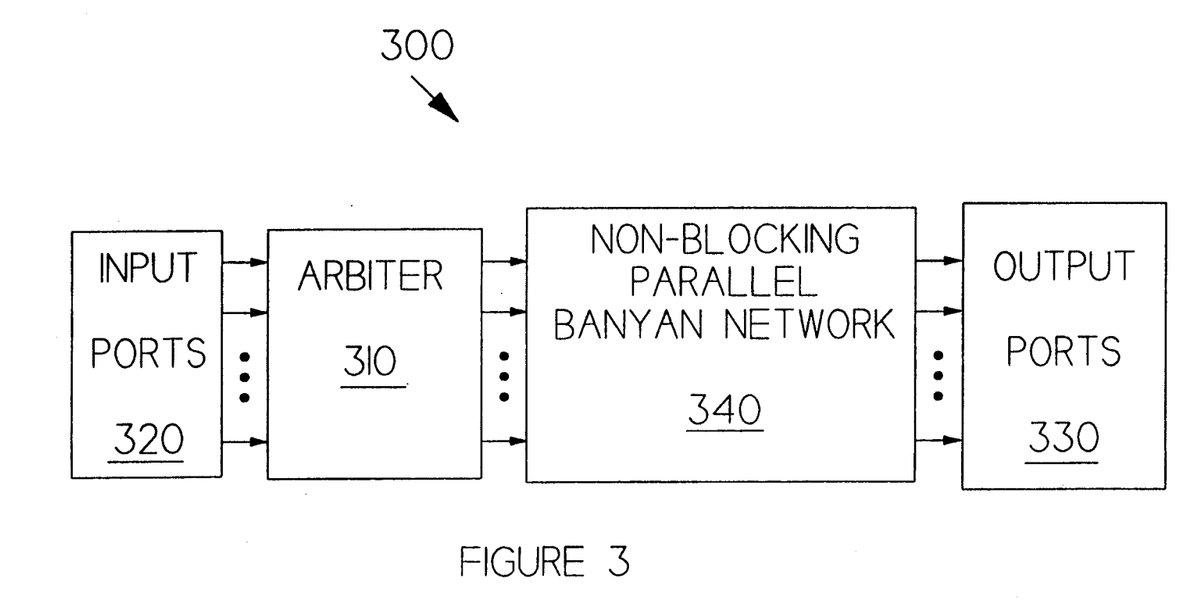
FIG. 3 is an illustration of the schematic placement of the Distributed Nonblocking Parallel Banyan Network according to the present invention.

FIG. 3 schematically describes an embodiment of the present invention comprising a switch 300 including input ports 320 coupled to an arbiter for output contention 310 and a Distributed Nonblocking Parallel Banyan Network (DNPBN) 340 disposed between input ports 320 and output ports 330 and coupled to arbiter 310. Arbiter 310 can be any system utilizing a method or arrangement for 20 arbitration of output contention for packets having identical destination addresses. One example is a token ring arbiter to be described below. DNPBN 340 routes packets from input ports 320 to the desired output port of output ports 330 without blocking as will be described in more detail below.

Figure 4:
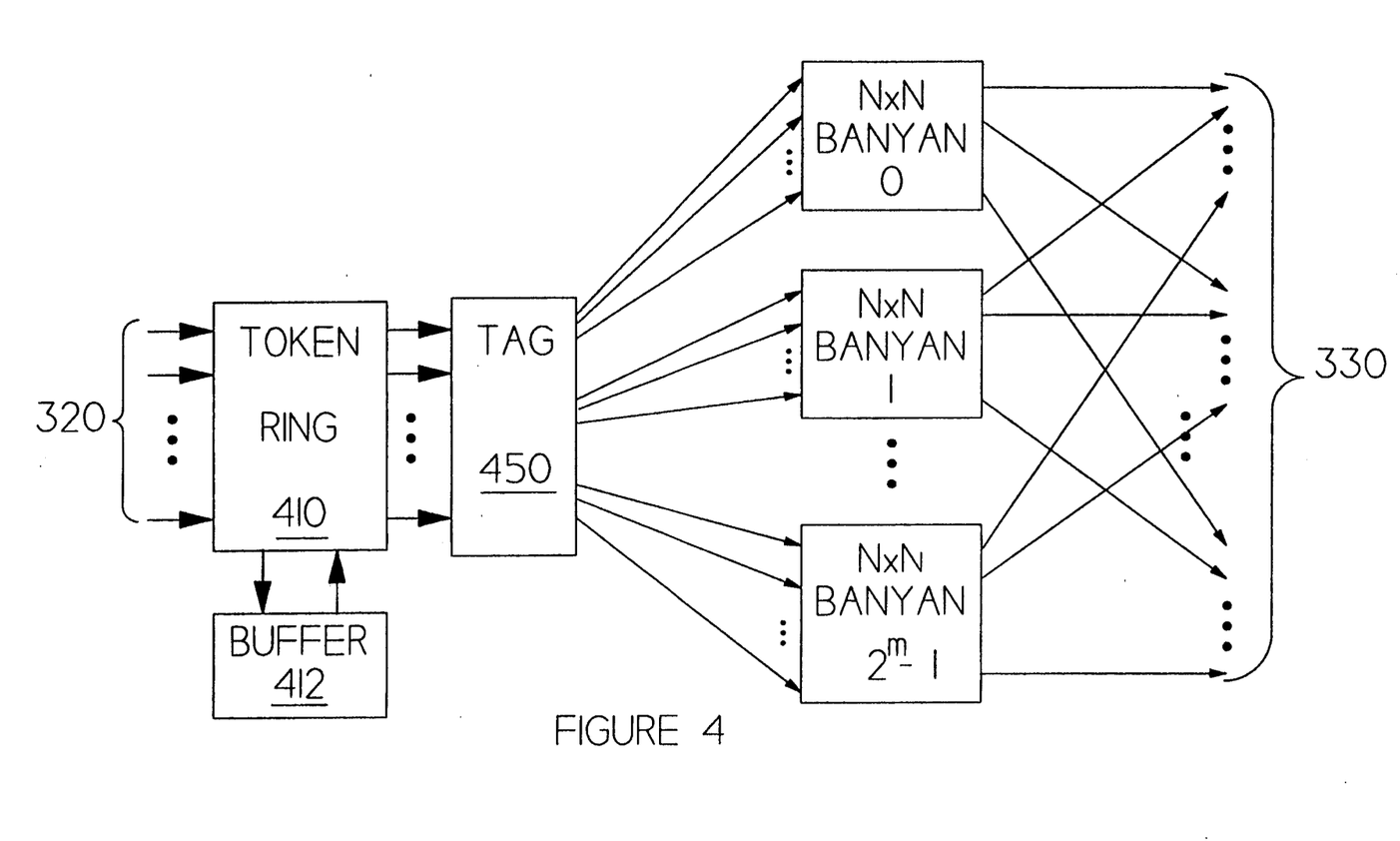
FIG. 4 is a schematic illustration of the preferred embodiment of the present invention showing the token ring arbiter, the tag, and the Banyan routers.

FIG. 4 illustrates the preferred embodiment of the present invention in more detail. Input ports 320 are coupled to a token ring arbiter 410 which is coupled to a tag device 450 which in turn is coupled to a plurality of parallel Banyan network routers 460 which are coupled to output ports 330. There are $N=2^k$ input lines included in input ports 380, where k also represents the number of bits in the packet destination address and the number of stages in the Banyan routers 460. Token ring arbiter 410 also has N output lines coupled to tag 450 which itself also has N output lines coupled to Banyan routers 460. There are $2^m$ routers 460 which are each N×N and are labeled from 0 to $2^m-1$ where m=integer(k/2). There are also N output lines in output ports 330.

In operation, token ring arbiter 410 has stations on a ring-shared bus, which stations are in a one-to-one correspondence with inputs ports 320. Token ring arbiter operates such that tokens with distinct labels move around the bus, each token representing the right to route a packet to the output (of output ports 330) matching its label. A station fetches the proper token for the head-of-line packet at its corresponding input port when the token passes by the station. If the token is already taken, the packet is stored in a buffer 412 for re-attempt later.

Token ring arbiter 410 transmits packets having distinct destination addresses to tag 450. Tag 450, in one embodiment of the present invention, performs an identification check of the destination address and distributes the packet to one of the parallel Banyan routers 460 based on the last m bits of the destination address.

According to the present invention, in a general system with k stages (and k bits in the destination address), when each incoming packet with the destination address $o_1 \ldots o_k$ arrives, tag 450 scans the m least significant bits of the destination address $o_{k-m+1} \ldots o_k$. Tag 450 then selects the one of Banyan routers 460 having a label equal to the number represented by the m bits given above. For example, for a k=3 system, tag 450 chooses the Banyan router with label equal to $o_3$; for k=4, tag 450 chooses the Banyan router with label equal to $o_3 o_4$; for k=5, $o_4 o_5$; and for k=6, Tag 450 then transmits this packet to the selected one of Banyan routers 460.

In each of Banyan routers 460, only the $2^{k-m}$ input lines with the labels forming all combinations of 0...0 can receive the incoming packet. That is, given k (and m=integer(k/2)), all possible combinations of $i_m$ to $i_{k-1}$ give the input line labels which will be active in the Banyan router. For example, for k=3, there are $2^1=2$ Banyan routers each of which has 8 input lines. The active input lines are given by the combination $i_1 i_2 0$, giving the input lines labeled [000], [010], [100], [110]. For k=5, there are 4 Banyan routers each having $2^3=8$ active input lines. The combination of active input lines is $o_1 i_2 i_3 i_4 0$, giving the input lines labeled [00000], [00010], [00100], [00110], [01000], [01010], [01100], and [01110]. In other words, the active input line labels all end with [0] and the inactive line labels end with [1]. Those inactive lines do not have a connection with tag 450 and are left as open ports.

Of the $2^{k-m}$ active input lines to the selected Banyan router, the specific line is chosen sequentially starting from the top input line to the bottom input line. This sequential selection is performed by tag 450 also.

One embodiment of the functions of tag 450 will now be described with reference to FIGS. 5 and 6.

Figure 5:
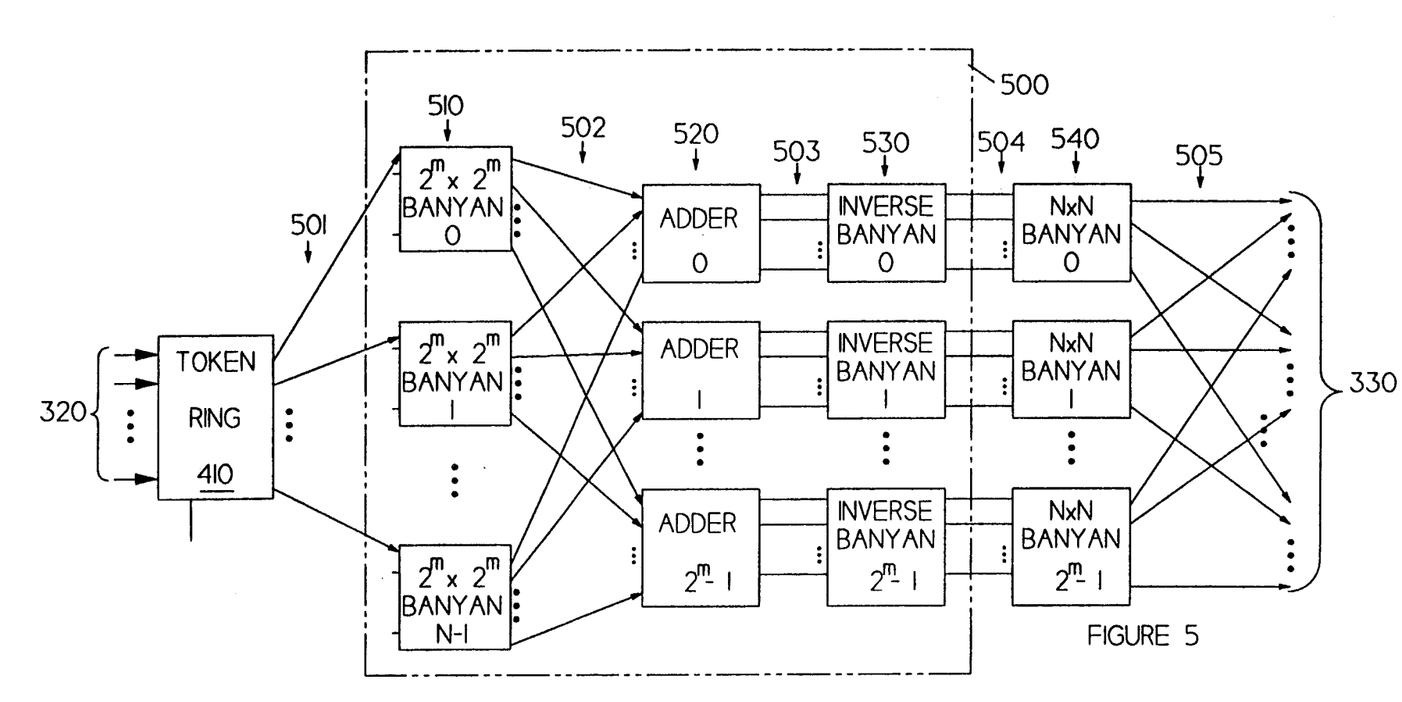
FIG. 5 is a schematic illustration of an exemplary 8×8 switching network according to the present invention.

FIG. 5 is a block diagram showing a general N×N tag device 500. Input ports 320 carry packets to token ring 410 which sends packets with distinct destination addresses over N input lines 501 to tag 500. Input lines 501 connect to $N2^m \times 2^m$ mini Banyan routers 510. Mini Banyan routers 510 are labeled from 0 to N−1 to correspond to the input lines 501. Mini Banyan routers route the packets according to the m least significant bits of the destination address $o_{k-m+1} \ldots o_k$ as described above. That is, each stage of each mini Banyan router 510 routes according to one of the bits of the last m bits of the destination address as described previously for Banyan routers in general.

The $2^m$ output lines of each mini Banyan router 510 connect to N input lines 502 of running sum adders 520.

Running sum adders 520 determine the packet output position for each of the N input lines 503 to $2^m$ inverse Banyan routers 530. The packet output position is determined simply in a top-down fashion beginning with "0" for a line with a packet and sequentially thereafter for active lines. Running sum adders are reset for each scan. This output position constitutes a temporary address for each input line to inverse Banyan routers 530. The temporary address is inserted in the header bits of the packet in a space reserved for that purpose.

Inverse Banyan routers 530 "compress" the N input lines to become $2^{k-m}$ active output lines grouped at the top half of the output ports of inverse Banyan routers 530. How this is achieved is described following.

Recall that each stage of a Banyan router operates on one of the bits of the packet destination address and that each stage consists a plurality of routing elements, the number of which depends on the number of input and output lines of the Banyan router. An inverse Banyan router is the inverse of a regular Banyan router in that the regular Banyan router is turned around such that the connections between stages in the front half are now in the back half and vice-versa.

Figure 6:
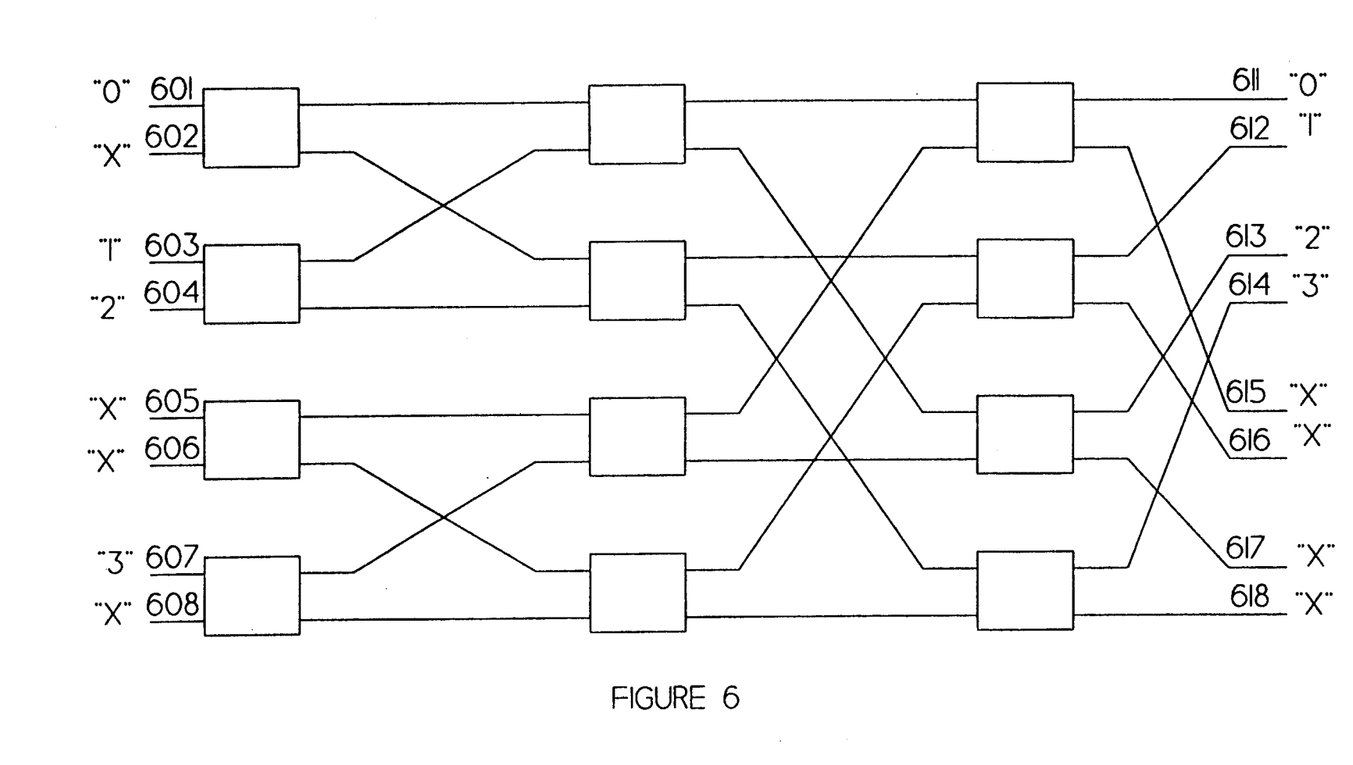
FIG. 6 shows an exemplary 8×8 inverse Banyan router according to the prior art.

FIG. 6 shows an exemplary $8\times 8$ inverse Banyan router 600. The temporary addresses were assigned by running sum adders 520 (of FIG. 5) as a monotonically increasing sequence with a number for active lines only. Exemplary temporary addresses are shown adjacent to input lines 601–608 with an "X" denoting an idle line. Inverse Banyan router 600 routes the packets using the bits of the temporary address as the routing bits. It may be shown that an inverse Banyan router routes the packets to output lines 611–618 such that all the packets appear on adjacent lines ordered by the temporary address (as shown by the addresses adjacent to output lines 611–618). The idle input lines of 601–608 will be connected to the remaining output lines of 611–618.

Returning to FIG. 5, the active output lines of inverse Banyan routers 530 are connected to $2^m-1$ Banyan routers 540 via $2^{k-m}$ lines 504 for each inverse Banyan router. Banyan routers 540 are connected to N output ports 330 via $2^{k-m}$ lines 505 for each Banyan router.

In another embodiment of the present invention, the 20 destination address check, choice of Banyan router, and selection of Banyan router input line described above are performed by a software routine. In such a routine, tag first scans the least significant m bits of the packet's destination address, $o_{k-m+1}... o_k$. Tag then selects the Banyan router with the address label equal to the number binarily represented by those m bits. Tag then sends the packet to the chosen Banyan router on the active lines chosen sequentially from top to bottom. This can be performed in the manner of a running sum adder. One routine to implement the functions just described is called "TAG" and was developed by Fujitsu and described in Kato, Y. et al., "Experimental Broadband ATM Switching System," Fujitsu Laboratories Ltd., Kawasaki, Japan, 1989. TAG is available from Fujitsu and known to those skilled in the telecommunications arts.

Returning now to the output from tag 450, after routing through the chosen Banyan router according to the destination address in the manner described previously, the packet is output on a limited number of router output lines. In the specific Banyan router with the label j (where $j=o_{k-m+1}...o_k$, the binary representation), because there are only $2^{k-m}$ input lines having packets possible, there are only $2^{k-m}$ output lines possibly having packets. Those $2^{k-m}$ output lines having the labels $x2^m+j$ (where $0 \leq x < 2^{k-m}$) can have an outgoing packet. In other words, as long as there is no output contention, the $x^{th}$ output line of the $j^{th}$ Banyan router links directly to the output port having the label $x2^m+j$. As in the input line case, only those active output lines are connected to tag 450 and the inactive lines are left as open ports.

Figure 7:
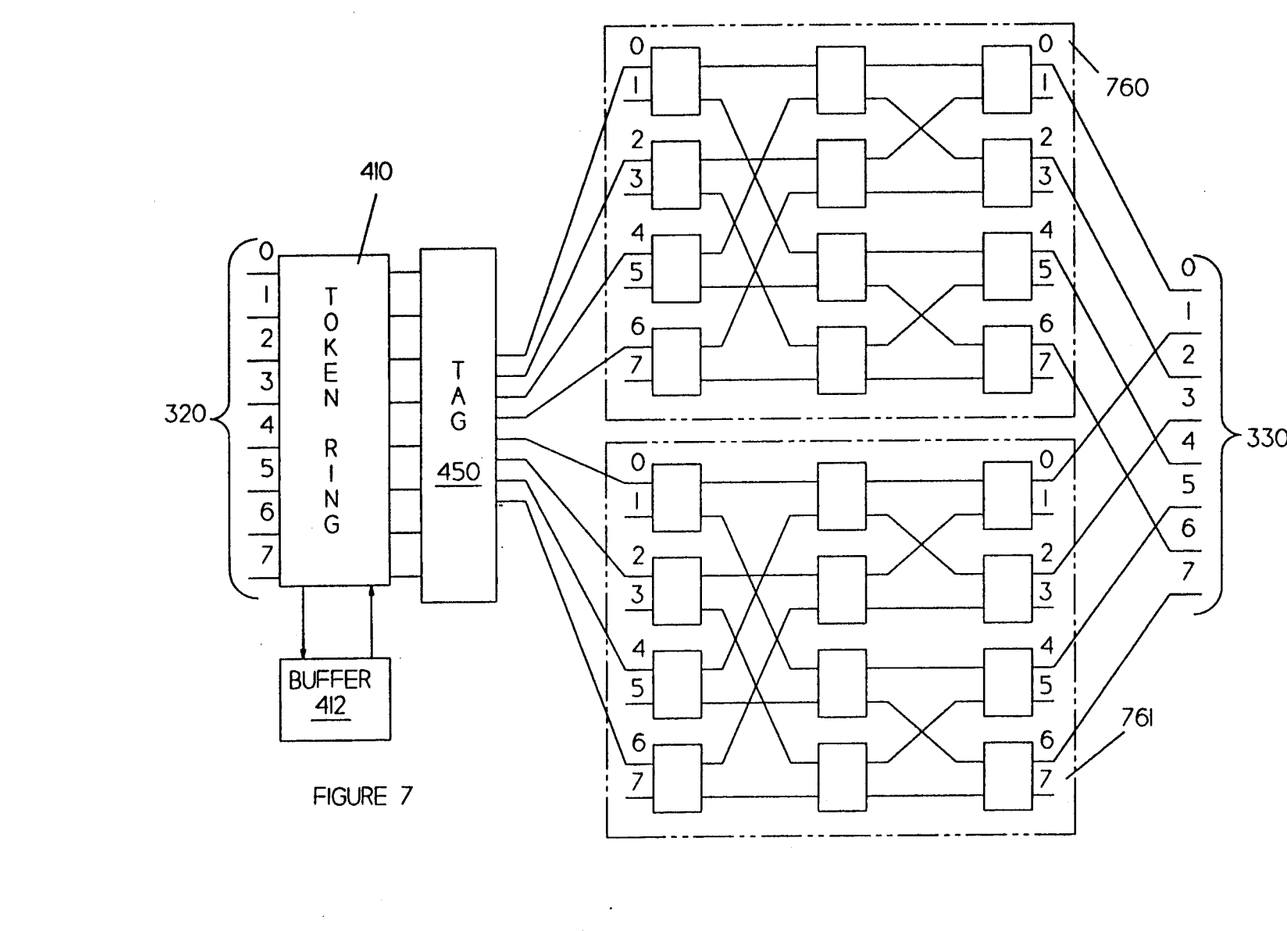
FIG. 7 shows an exemplary embodiment of the packet routing switch of the present invention for the case $k=3$.

An example of the DNPBN is presented for $k=3$ as shown in FIG. 7. Incoming packets arrive at input ports 320. Token ring arbiter 410 sends only packets with distinct destination addresses to tag 450. Suppose an incoming packet on input port #4 ($i_1 i_2 i_3=[100]$) has a distinct destination address given by $o_1 o_2 o_3=[101]$. From the definitions given above, $m=\text{integer}(k/2)=1$ and $N=2^k=8$. Tag 450 sends the packet to the router with the label $j=o_{k-m+1}...o_k=o_3=1$. That is, of the Banyan routers 460 (of FIG. 4), router #1 (761) receives the packet as distributed by tag 450. In each Banyan router, only four ($2^{k-m}=4$) of the eight input lines can receive packets. These four input lines are labeled [000], [010], [100], and [110] and correspond to router input lines 0, 2, 4, and 6. The specific input line to Banyan router #1 is chosen sequentially among the four active lines starting from the top by tag 450. In router #1, since only four of the eight input lines can receive packets, there are also only four output lines from router #1 possibly having packets. These four output lines have the labels $=x2^m+j$ (where $0\leq x<2^{k-m}$). For this example, the possible labels are: $x(2)+1$, where x can have the values 0, 1, 2, and 3. This gives the labels of the output lines of router #1 corresponding to the output ports 1, 3, 5, and 7. In this example, the destination address is $[101]=5$, so the packet will be sent to output port 5.

In summary, the present invention provides a packet routing network switch having switching speeds commensurate with data rates of optical fiber networks and which guarantees nonblocking packet routing.

While the above description was made with respect to communication systems, it is understood to those skilled in the art that the present invention is applicable to other fields utilizing the transmission of electronic signals, for example computers and electronic instruments of all kinds. Accordingly, while the above description provides a full and complete description of the preferred embodiments of the present invention, various modifications, alternate constructions and equivalents may be employed. Therefore, the above description and illustrations should not be construed as limiting the scope of the invention which is defined by the following claims.

What is claimed is:

1. A packet routing network for outputting information packets input on a plurality of network input ports thereto to a plurality of network output ports therefrom, each network input port having a network input port label, and each packet having a destination address specifying one of said output ports to which each packet is to be routed, said packet routing network comprising:
assigning means for assigning to each packet a packet bit sequence formed from the network input port label and the destination address;
a plurality of Banyan routers, disposed in parallel with each other, said Banyan routers having a plurality of router input lines and router output lines, said router output lines coupled to said network output ports; and distribution and selection means, coupled between said network input ports and said router input lines, for distributing packets having distinct destination addresses to said Banyan routers, each said packet being routed to one of said Banyan routers, the specific said Banyan router being determined by said packet bit sequence.

2. The packet routing network of claim 1 further comprising arbiter means, coupled to said network input ports and having a plurality of arbiter output lines coupled to said distribution and selection means for transmitting only packets having distinct destination addresses over said arbiter output lines.

3. A packet routing network for outputting information packets input on a plurality of network input ports thereto to a plurality of network output ports therefrom, each packet having a destination address specifying one of said output ports to which each packet is to be routed, said packet routing network comprising:

a plurality of Banyan routers, disposed in parallel with each other, said Banyan routers having a plurality of router input lines and router output lines, said router output lines coupled to said network output ports; and distribution and selection means, coupled between said network input ports and said router input lines, for distributing packets having distinct destination addresses to said Banyan routers and selecting one of said Banyan routers and one of said router input lines such that the distributed packets will not collide with any other packets while being routed through said Banyan router, said packets routing network further comprising arbiter means, coupled to said network input ports and having a plurality of arbiter output lines coupled to said distribution and selection means for transmitting only packets having distinct destination addresses over said arbiter output lines, wherein said arbiter means comprises a token ring arbiter for transmitting only packets having distinct destination addresses and storing packets not having distinct destination addresses in a buffer for re-attempt at a later time.

4. A packet routing network for outputting information packets input on a plurality of network input ports thereto to a plurality of network output ports therefrom, each packet having a destination address specifying one of said output ports to which each packet is to be routed, said packet routing network comprising:

a plurality of Banyan routers, disposed in parallel with each other, said Banyan routers having a plurality of router input lines and router output lines, said router output lines coupled to said network output ports; and distribution and selection means, coupled between said network input ports and said router input lines, for distributing packets having distinct destination addresses to said Banyan routers and selecting one of said Banyan routers and one of said router input lines such that the distributed packets will not collide with any other packets while being routed through said Banyan router, and arbiter means, coupled to said network input ports and having a plurality of arbiter output lines coupled to said distribution and selection means for transmitting only packets having distinct destination addresses over said arbiter output lines, wherein each packet has a binary k-bit destination address designating one of said network output ports, represented by a bit sequence $o_1, o_2, \ldots, o_k$, and is input on one of said network input ports having binary labels represented by a bit sequence $i_1, i_2, \ldots, i_k$, the number of said Banyan routers being $2^m$, where m is the integer part of k/2, each of said Banyan routers having distinct binary label taken in order from the sequence $0, 1, \ldots, (2^m-1)$ and $2^{k-m}$ active router input lines given by all binary combinations of $0 \ldots 0 i_m \ldots i_{k-j} 0$, said distribution and selection means comprises a tag device for receiving packets having an address from said arbiter means, selecting the Banyan router labeled $o_{k-m+1} \ldots o_k$, and transmitting the packet to one of said selected Banyan routers via one of said active router input lines.

5. The packet routing network of claim 4 wherein said active router input lines are chosen sequentially.

6. A packet routing network for outputting information packets input on a plurality of network input ports thereto to a plurality of network output ports therefrom, each packet having a destination address specifying one of said output ports to which each packet is to be routed, said packet routing network comprising:

a plurality of Banyan routers, disposed in parallel with each other, said Banyan routers having a plurality of router input lines and router output lines, said router output lines coupled to said network output ports; and distribution and selection means, coupled between said network input ports and said router input lines, for distributing packets having distinct destination addresses to said Banyan routers and selecting one of said Banyan routers and one of said router input lines such that the distributed packets will not collide with any other packets while being routed through said Banyan router, and arbiter means, coupled to said network input ports and having a plurality of arbiter output lines coupled to said distribution and selection means for transmitting only packets having distinct destination addresses over said arbiter output lines, wherein each packet has a binary k-bit destination address designating one of said network output ports, represented by a bit sequence $o_1, o_2, \ldots, o_k$, and is input on one of said network input ports having binary labels represented by a bit sequence $i_1, i_2, \ldots, i_k$, said arbiter means comprising token ring arbiter for transmitting only packets having distinct destination addresses and storing packets not having distinct destination addresses in a buffer for re-attempt at a later time, the number of said Banyan routers being $2^m$, where m is the integer part of k/2, each of said Banyan routers having a distinct binary label taken in order from the sequence $0, 1, \ldots, (2^m-1)$ and $2^{k-m}$ active router input lines given by all binary combinations of $0 \ldots 0 i_m \ldots i_{k-j} 1$, said distribution and selection means comprising a tag device for receiving a packet having a distinct destination address from said arbiter means, selecting a Banyan router labeled $o_{k-m+1} \ldots o_k$, and transmitting the packet to one of said Banyan routers labeled $o_{k-m+1} \ldots o_k$ via one of said active router input lines.

7. The packet routing network of claim 6 wherein active router input lines are chosen sequentially.

8. A packet routing network for outputting information packets input on a plurality of network input ports thereto to a plurality of network output ports therefrom, each packet having a k bit destination address represented by a bit sequence $o_1, o_2, \ldots o_k$ specifying one of said network output ports to which the packet is to be sent, and being input on said network input ports having binary labels represented by a bit sequence $io_1, i_2, \ldots i_k$, said packet routing network comprising:

assigning means for assigning to each packet a packet bit sequence comprising the network input port label bit sequence and the destination address bit sequence $i_1, i_2, \ldots i_k o_1, o_2, \ldots o_k$;

arbiter means coupled to said network input ports and having a plurality of arbiter output lines, for transmitting only packets having distinct destination addresses over said arbiter output lines, said arbiter including a token ring arbiter for transmitting only packets having distinct destination addresses and storing packets not having distinct destination addresses in a buffer for re-attempt at a later time;

a plurality of Banyan routers, disposed in parallel with each other, said Banyan routers having a plurality of router input lines and router output lines, said router output lines coupled to said network output ports, the number of said Banyan routers being $2^m$, where m is the integer par to k/2, each of said Banyan routers having a distinct binary label taken for the sequence $0 \ldots (2^m-1)$ and $2^{k-m}$ active router input lines given by all combinations of $0 \ldots 0i_m \ldots i_{k-}0$; and distribution and selection means, coupled between said arbiter output lines and said router input lines, for distributing packets having distinct destination addresses to said Banyan routers and selecting one of said Banyan routers such that the distributed packets will not collide with any other packets while being routed through said Banyan router, said distribution and selection means including a tag device for receiving a packet having a distinct destination address, selecting a Banyan router labeled $o_{k-m+1} \ldots o_k$, and transmitting the packet to one of said Banyan routers labeled $o_{k-m+1} \ldots o_k$ via one of said active router input lines chosen sequentially.

* * * * *

UNITED STATES PATENT AND TRADEMARK OFFICE
CERTIFICATE OF CORRECTION

PATENT NO. : 5,132,965

DATED : July 21, 1992

INVENTOR(S) : Zhang

It is certified that error appears in the above-identified patent and that said Letters Patent is hereby corrected as shown below:

Column 5, line 14 and 15, delete "as shown following" and insert therefor --as follows--.

Column 2, lines 27-34, combine lines 27-34 into one paragraph.

Column 4, line 24, delete "12" and insert therefor --121--.

Column 5, line 56, delete "shown following" and insert therefor --as follows--.

Column 7, line 60, delete "380" and insert therefor --320--.

Column 8, line 13, delete "20".

Column 8, line 28, after "k=6", insert --$0_4 0_5 0_6$--.

Column 9, line 14, delete "described following" and insert therefor --as follows--.

Column 12, line 11, after "having" insert --a--.

Column 12, line 43, after "router" insert --;--.

Column 12, line 52, delete "is input on one of said" and insert therefor --are input on Column 12, line 54, after "comprising" insert --a--.

Column 12, line 63, 64, delete "$0...0i_m...i_{k-1}1$" and insert therefor --$0...0i_m...i_{k-1}0$--.

Column 13, lines 13 and 14, delete "$io_1, i_2,...i_k,$" and insert therefor --$i_1, i_2,...i_k,$--.".

UNITED STATES PATENT AND TRADEMARK OFFICE
CERTIFICATE OF CORRECTION

PATENT NO. : 5,132,965
DATED : July 21, 1992
INVENTOR(S) : Zhang

It is certified that error appears in the above-indentified patent and that said Letters Patent is hereby corrected as shown below:

Column 14, line 8, delete "par" and insert therefor --part--.

Signed and Sealed this

Twenty-third Day of November, 1993

Attest:

BRUCE LEHMAN

*Attesting Officer*     *Commissioner of Patents and Trademarks*